(12) United States Patent
Brown

(10) Patent No.: US 7,867,365 B2
(45) Date of Patent: Jan. 11, 2011

(54) ETHANOL DISTILLATION WITH DISTILLERS SOLUBLE SOLIDS RECOVERY APPARATUS

(75) Inventor: Christopher J. Brown, Amherst, NY (US)

(73) Assignee: Thermal Kinetics Systems, LLC, Amherst, NY (US)

(*) Notice: Subject to any disclaimer, the term of this patent is extended or adjusted under 35 U.S.C. 154(b) by 1082 days.

(21) Appl. No.: 10/546,846

(22) PCT Filed: Mar. 29, 2004

(86) PCT No.: PCT/US2004/009898

§ 371 (c)(1),
(2), (4) Date: Jun. 23, 2006

(87) PCT Pub. No.: WO2004/088230

PCT Pub. Date: Oct. 14, 2004

(65) Prior Publication Data

US 2007/0000769 A1   Jan. 4, 2007

(51) Int. Cl.
- B01D 1/00 (2006.01)
- B01D 3/00 (2006.01)
- C07C 29/80 (2006.01)
- C12P 7/06 (2006.01)

(52) U.S. Cl. .......................... 203/19; 159/2.1; 159/46; 159/47.1; 202/154; 202/155; 202/161; 202/173; 202/176; 203/22; 203/25; 203/27; 203/82; 203/DIG. 8; 210/513; 210/770; 210/774; 435/161; 568/916

(58) Field of Classification Search .................. 202/154, 202/155, 161, 172, 173, 176, 186; 203/19, 203/21–27, 73, 82, 84, 88, DIG. 8; 159/2.1, 159/23, 46, 47.1; 210/187, 513, 770, 774; 435/161; 568/916
See application file for complete search history.

(56) References Cited

U.S. PATENT DOCUMENTS

| | | |
|---|---|---|
| 1,822,454 A | 9/1931 | Ricard et al. |
| 1,860,554 A | 5/1932 | Ricard et al. |
| 2,985,589 A | 5/1961 | Broughton et al. |
| 3,114,782 A | 12/1963 | Fleck et al. |
| 3,201,491 A | 8/1965 | Stine et al. |
| 3,265,750 A | 8/1966 | Peck et al. |
| 3,510,423 A | 5/1970 | Neuzil et al. |
| 3,558,732 A | 1/1971 | Neuzil et al. |
| 3,668,267 A | 6/1972 | Hedge |
| 3,686,342 A | 8/1972 | Neuzil |

(Continued)

Primary Examiner—Virginia Manoharan
(74) Attorney, Agent, or Firm—Jaeckle Fleischmann & Mugel LLP

(57) ABSTRACT

The present invention relates to a system for producing ethanol from an organic source and that operates to purify and dry ethanol from a beer source. The system for producing substantially anhydrous ethanol comprises: (a) a first distillation stripping column; (b) a second distillation rectifying column having a higher operating temperature than said stripping column; (c) a molecular sieve dehydration means in fluid communication with said rectifying column. Heat from the overhead of the second distillation rectifying column and the molecular sieve dehydration are used to heat the first distillation stripping column.

18 Claims, 4 Drawing Sheets

SIMPLIFIED FLOW SCHEMATIC

U.S. PATENT DOCUMENTS

| | | |
|---|---|---|
| 3,997,620 A | 12/1976 | Neuzil |
| 4,161,429 A | 7/1979 | Baiel et al. |
| 4,217,178 A | 8/1980 | Katzen et al. |
| 4,333,740 A | 6/1982 | Priegnitz |
| 4,372,822 A | 2/1983 | Muller et al. |
| 4,422,903 A | 12/1983 | Messick et al. |
| 4,502,921 A * | 3/1985 | Shinskey .................... 202/154 |
| 4,539,076 A * | 9/1985 | Swain ........................ 202/154 |
| 4,552,775 A | 11/1985 | Baeling et al. |
| 4,556,460 A | 12/1985 | Robertson et al. |
| 4,636,284 A * | 1/1987 | English et al. ................ 203/18 |
| 4,952,504 A | 8/1990 | Pavilon |
| 5,035,776 A | 7/1991 | Knapp et al. |
| 5,294,304 A | 3/1994 | Kano et al. |
| 5,457,277 A | 10/1995 | Sy |
| 5,501,776 A | 3/1996 | Lermite et al. |
| 5,554,264 A | 9/1996 | Sy |
| 5,662,810 A | 9/1997 | Willgohs |
| 5,766,895 A | 6/1998 | Valkanas et al. |
| 5,865,957 A | 2/1999 | Ueda et al. |
| 6,106,674 A | 8/2000 | Agrawal et al. |
| 7,297,236 B1 * | 11/2007 | Vander Griend ............ 202/153 |
| 7,507,273 B1 * | 3/2009 | Massie .......................... 95/86 |
| 2005/0266539 A1 * | 12/2005 | Hochberg et al. ........... 435/161 |
| 2007/0000769 A1 * | 1/2007 | Brown ........................ 203/19 |

* cited by examiner

SIMPLIFIED FLOW SCHEMATIC

ETHANOL DISTILLATION WITH DISTILLERS SOLUBLE SOLIDS RECOVERY APPARATUS

BACKGROUND

Ethanol production presents four challenges that must be met in order to economically produce ethanol useful as a fuel additive. First, there must be an effective system so that primary stripping of ethanol/water from stillage (beer) can be accomplished and energy effective rectification of the ethanol/water mixture can be made. Second, an effective system for dehydrating the rectified ethanol/water product must be developed that integrates with the product distillation system and also is integrated in the energy management of that system. Third, an energy efficient system of de-watering the stillage to the maximum level must also be integrated into the overall system. Forth, the propensity for the stillage to foul surfaces in distillation and evaporation must be controlled to limit the time and expense of cleaning the system. Additionally, there is a need to limit energy usage in the dryer and thermal oxidizer which, are part of the system to recover dried distillers grains and soluble solids.

Diminishing world supplies and availability of crude oil as well as sporadic regional shortfalls of gasoline for motor fuel have created considerable incentive for the development and use of alternative fuels. Furthermore, environmental concerns have required use of additives which aid in oxygenation of the motor fuels. These additives have created concerns of their own for environmental damage. Ethanol is gaining wide popularity as a fuel additive capable of addressing these concerns, particularly when mixed with gasoline to form a mixture known as gasohol. Gasohol may contain up to about 10 vol. % ethanol, without modifications to presently used automobile engines being required, thereby extending the volume of motor fuel availability by a like percentage.

The source of the ethanol used in gasohol is derived primarily from the fermentation of mash, usually from corn or wheat or other grain. Natural fermentation is able to produce an ethanol-water product mixture containing, at the most, about 12 vol. % ethanol. This mixture may easily be concentrated by distillation to about 95% ethanol. Higher concentrations of ethanol, however, as required in gasohol are obtained only by expenditures of great amounts of energy and great difficulty due to the formation of an ethanol-water azeotrope at about the 95% ethanol concentration. A means of achieving the greater than 95% ethanol concentration without 1) such a great expenditure of energy or 2) loss of the used energy would thus be extremely valuable. Such schemes have been employed in the past to recover heat from azeotropic distillation employing tertiary entrainers such as benzene (U.S. Pat. Nos. 4,372,822, 4,422,903 and 5,035,776). Others earlier had considered the option of using heat from the stripping/rectifying column to heat an azeotropic distillation (U.S. Pat. Nos. 1,860,554 and 4,217,178). Additionally, one invention considered generating steam from the heat in overhead vapors of the azeotropic distillation (U.S. Pat. No. 4,161,429) and another used mechanical vapor recompression of the overhead vapors to recover heat in the fashion of a heat pump for heating the azeotropic distillation column(s) (U.S. Pat. No. 5,294,304).

Recent industrial practice includes the many known adsorptive separation processes known in the art for possible application to the separation of ethanol from water, but do so without attention to the heat that can be recovered from the process. The adsorption method is employed in many ways and of itself is a significant improvement for energy usage and environmental impact over azeotropic entrainers and azeotropic distillation. To this date however, little has been done to further improve heat recoveries for the adsorptive dehydration operation.

For general background of the art, it is well-known in the separation art that certain crystalline aluminosilicates can be used to separate hydrocarbon species from mixtures thereof. The separation of normal paraffins from branched chain paraffins, for example, can be accomplished by using a type A zeolite which has pore openings from 3 to about 5 Angstroms. Such a separation process is disclosed in U.S. Pat. Nos. 2,985,589 and 3,201,491. These adsorbents allow a separation based on the physical size differences in the molecules by allowing the smaller or normal hydrocarbons to be passed into the cavities within the zeolitic adsorbent, while excluding the larger or branched chain molecules.

U.S. Pat. Nos. 3,265,750 and 3,510,423, for example, disclose processes in which large pore diameter zeolites such as the type X or type Y structured zeolites can be used to separate olefinic hydrocarbons.

In addition to separating hydrocarbon types, the type X or type Y zeolites have also been employed in processes to separate individual hydrocarbon isomers. In the process described in U.S. Pat. No. 3,114,782, for example, a particular zeolite is used as an adsorbent to separate alkyl-trisubstituted benzene; and in U.S. Pat. No. 3,668,267 a particular zeolite is used to separate specific alkyl-substituted naphthalenes. In processes described in U.S. Pat. Nos. 3,558,732, 3,686,342 and 3,997,620, adsorbents comprising particular zeolites are used to separate para-xylene from feed mixtures comprising para-xylene over the other xylene isomers. In the last mentioned processes the adsorbents used are para-xylene selective; para-xylene is selectively adsorbed and recovered as an extract component while the rest of the xylenes and ethylbenzenes are all relatively unadsorbed with respect to para-xylene and are recovered as raffinate components. Also, in the last mentioned processes the adsorption and desorption may be continuously carried out in a simulated moving bed countercurrent flow system, the operating principles and sequence of which are described in U.S. Pat. No. 2,985,589.

The process of adsorption within the Zeolyte bed depends on two factors. The first is a basic affinity of the Zeolyte substrate for binding molecules of vapor in a condensed/adsorbed state. The second is a property of the Zeolyte that preferentially binds water rather than ethanol. The vapor, comprised of ethanol and water, is passed through the bed of type 3A Zeolyte. The water molecules diffuse into the 3 angstrom pores of the Zeolyte adsorbing onto the surface substrate. Since the ethanol molecules are much larger, they pass through the bed adsorbing as a very minor fraction on the exterior of the Zeolyte pellets.

Water adsorbing onto the Zeolyte surface largely forms a monolayer of "condensed" film. This releases energy into the bed and vapor passing through the bed. This energy is a combination of latent heat of vaporization/condensation for the water and a surface specific energy that results from the formation of the monolayer of water molecules on the substrate surface. During adsorption the bed increases in temperature and retains a large portion of this energy. During desorption the bed decreases in temperature as this heat is released with the evaporation of water from the Zeolyte.

Another problem presented in the production of ethanol is the removal of solids from the production stream. In the production of fuel alcohol from plant materials, the biomass is mixed with hot water to produce a wort, which is fermented until the final alcohol level is reached. The fermented contents are then typically discharged as a slurry to the beer well and from there to the beer still where the alcohol is removed by distillation. The remainder, after distillation, is known as the still bottoms or stillage, and consists of a large amount of water together with the spent solids.

Stillage in general has a complex composition, which in the case of corn feed stocks, includes the non-fermented fibers from the hull and tipcap of the corn kernel, as well as, particles of the corn germ with high oil content, oil and other lipids, the non-fermented portions of the corn kernel such as gluten, any residual unreacted starch, solubles such as proteins and enzymes, and the byproducts and residue of fermentation including dead yeast cells. The particle sizes range widely from broken parts of kernels 1-2 millimeters in size, down to fines in the under 10 micron range. Typically, stillage is dewatered to produce animal feeds rich in protein. This feed-production process has added benefit of reducing waste disposal costs from the alcohol production. It also has the very important benefit of providing a rich protein source to cattle not derived from reprocessed cattle carcasses (an important concern for transmission of damaging prions).

A conventional process for handling stillage, currently used in typical dry mill ethanol plants has aqueous solids, such as whole stillage from corn, flow from a distillation column to a solid bowl decanter centrifuge which separates the feed stream according to density into cake (the "heavier" substances), and thin stillage (the lighter substances). Since most corn solids are heavier than water, the cake contains most of the solids. The thin stillage typically has 8 to 15% solids of which about 10% or more are suspended insoluble solids, the remainder being dissolved solids including proteins, acids, unreacted sugars, and others. The suspended solids in the thin stillage are predominately fines but there is not a sharp cutoff since some larger particles are subject to carry-over with the liquid. Thin stillage is typically accumulated in a holding tank, from which typically 30-60% is recirculated as "backset" to the cooking and fermentation stages to provide nutrients and to reduce the fresh water requirements. The remainder of the thin stillage is sent to the evaporator which concentrates the solids to a syrup of typically 30-35% solids in dry mill plants. Wet mill plants, which do not have such a load of insoluble solids can achieve a syrup concentration of 50%. This syrup is added to the cake and the combined stream is, typically, sent to the dryer (not shown) to be dried to about 10-11% moisture.

The dewatering machinery which are generally most effective at producing high dry solids content, such as screen centrifuges and screw presses, have not proven feasible with corn stillage. Indeed, corn stillage and stillage from other grain fermentation has proven to be too fine and sticky for most separation devices. The typical industry practice has been to dewater such stillage using a solid bowl decanter centrifuge which is very functional, but which typically only produce cake solids content in the 30-35% range, in addition to having high electricity usage and high maintenance costs. However, up till now, the only way to improve performance of thin stillage evaporation has been to accomplish the most complete centrifugation of the stillage.

Numerous methods of overcoming this situation have been reported, such as separating most of the solids from the beer liquid prior to distillation so as to permit use of a screw press as described by B. J. Low in "The Efficient Production of High Quality Distiller's Dark Grains Using Stored Dehydration Process Technology." The separation step is followed by dewatering in a screw press to a solids content of 50-54%, and then by drying in a special dryer. However, the presence of the alcohol at the separation step greatly complicates the drying process, requiring special closed-cycle dryers which are costly to purchase and expensive to maintain, as well as necessitating an alcohol vapor recovery system.

In some such ethanol production processes, such as in the production of ethanol from citrus residue as described in U.S. Pat. No. 4,952,504 issued to Pavilon, highly effective dewatering machinery such as screen centrifuges and screw presses (yielding dry-solids content typically 35-50% or higher) can be used to efficiently dewater solids filtered from the wort prior to fermentation. In fermentation from grains such as corn, however, this dewatering from the wort stage has the disadvantage of reducing the final alcohol yield.

U.S. Pat. No. 4,552,775, issued to Baeling, discloses a method for dewatering the stillage from a unique fermentation process which produces stillage of 20-30% dry substance (compared to the conventional corn fermentation which produces a stillage in the 5-12% solids range). This high solids stillage is combined with sufficient recycled dry product to obtain a 50-70% dry substance content which is then pelletized before drying in a through air dryer of special design. This method has the disadvantage that when applied to conventional stillages of 5-12% solids, the required recycle rate becomes very large, increasing the size and expense of the dryer.

A significant need remains for an improved, efficient and cost-effective method and apparatus to dewater conventional grain stillage, for the fuel alcohol industry.

The production of gasohol by the blending of fuel grade ethanol with gasoline has the potential for helping meet energy needs. Alcohol blends with gasoline require 99.35 percent alcohol. To make effective use of ethanol as a substitute fuel the energy consumed to make the fuel grade alcohol must be less than the energy obtained from ethanol (84,090 Btu/gal or 7120 cal/g).

The conventional method to concentrate an aqueous solution of ethanol involves two steps: first, a dilute ethanol-water mixture (6-12 percent ethanol) is distilled to about 95 percent; next, the solution of step one is azeotropically distilled to anhydrous alcohol having a concentration of about 99.8 percent. Distillation energy requirements are composed of the steam required for the main distillation step producing azeotropic ethanol and that required for breaking the azeotrope and producing essentially anhydrous ethanol. The energy for the first step depends more on the feed ethanol concentration than any other factor and this energy represents the minimum practical energy usage for a plant. Simple (non-azeotropic) distillation is limited with regard to ethanol-enrichment because the alcohol-water mixture forms a constant boiling azeotrope at 95.6 percent ethanol. One complication at this upper end is an inflection in the vapor-liquid equilibrium relationship, which upon closer approach to the azeotropic composition requires a considerable increase in the number of distillation trays required and the height of the column. The energy required for azeotropic distillation is typically recovered for use in preheating and to offset heat requirements in the main distillation. An example of this is U.S. Pat. No. 4,422,903. This patent teaches the art of constructing a double effect stripping/rectification column and recovering heat from azeotropic distillation to one of the two stripping/rectification columns.

The theoretical amount of energy expended to distill ethanol from 5 to 100 percent calculated by balancing heat input into the system and heat lost is about 3420 cal/g. In industrial practice, the actual energy expended during distillation is lower than theoretical due to the inclusion of various heat recovery systems. The reported loss of the fuel value to distill from 10 percent to 95 percent ethanol in industrial practice is about 13-21 percent; the loss of fuel value to concentrate from 95 to 100 percent by azeotropic distillation with benzene is an additional 7-11 percent. Overall expenditure is about 1400-2400 cal/g. The capital cost to produce 100 percent ethanol with an expenditure of only about 1400 cal/g is nearly double that of a distillation plant producing 95 percent ethanol due to the inclusion of azeotropic distillation equipment and advanced design heat recovery systems.

Several alternate approaches to obtain anhydrous ethanol which eliminate the energy costly azeotropic distillation have been suggested. These include dehydrating ethanol with such materials as gypsum, calcium chloride and lime, molecular sieves, biomass materials or the like, or solvent extraction. One technique involves the use of sorbents to selectively adsorb water from an ethanol-water mix. In the Purdue process (Chemical Engineering, Vol. 87, p. 103, Nov. 17, 1980), ethanol-rich vapors (80-92 percent ethanol) leaving a first stage distillation at a temperature of about 78 [deg]-80 [deg] C. are passed directly onto a column of cornmeal to adsorb water and obtain anhydrous ethanol. After the column is saturated, the cornmeal is regenerated by passing hot (90.degree.-120 [deg] C.) air over it; simultaneously, a second previously regenerated column is brought into operation. Overall energy expenditure for the distillation and sorption processes including the distillation step is about 1000 cal/g. The process is used in a modified fashion industrially in which corn grits and carbon dioxide are substituted for cornmeal and air.

The most accepted approach to dehydration now used industrially is to use type 3A Zeolyte molecular sieve adsorption. Typically a two bed system is used in which one bed receives a flow of azeotropic ethanol for dehydration and the other undergoes regeneration. The beds are operated in a vapor phase pressure swing approach. The dehydration takes place at an elevated pressure while the regeneration takes place under vacuum. Typically overhead azeotropic ethanol from distillation is condensed, pumped to a vaporizer to elevate the dehydration pressure then recondensed after dehydration. Under this process configuration the ethanol is condensed twice without recovery. Another industrially applied technique is to supply the azeotropic ethanol directly from the distillation column without first condensing and only condense after dehydration. In this case the ethanol is condensed once without recovery.

Thus a system that effectively reuses energy, effectively removes insoluble solids prior to evaporation, dewaters solids using waste heat, reduces the rate of fouling in distillation and on heating surfaces, and uses non-azeotropic methods of ethanol dehydration in which energy is further recovered to the process would be desirable.

SUMMARY OF THE INVENTION

The present invention relates to a system for producing ethanol from an organic source and that operates to purify and dry ethanol from a beer source. The system for producing substantially anhydrous ethanol comprises: (a) a first distillation stripping column that operates between 160 to 220 degrees F.; (b) a second distillation rectifying column having a higher operating temperature than said stripping column; (c) a molecular sieve dehydration means in fluid communication with said rectifying column; and (d) an energy control means; wherein after distilling a first ethanol and water mixture in the first distillation column to produce a first concentrated ethanol overhead vapor stream, the first concentrated ethanol overhead vapor stream is condensed to form a second ethanol and water mixture; wherein the second ethanol and water mixture is distilled in the second distillation column to produce a second concentrated ethanol overhead vapor stream and then condensed to form a third ethanol and water mixture; wherein the third ethanol and water mixture is dehydrated to produce a substantially anhydrous ethanol; wherein heat is recovered from the second distillation column; and wherein the first distillation column is heated with the heat recovered from the second distillation column. Further, heat from the said first distillation stripping column in its overhead vapor is recovered to heat an evaporator of single, double or triple effect configuration, and heat is finally rejected to an evaporative condenser.

A reduction of overall energy usage is further proposed through a means to achieve a higher concentration of distillers soluble solids in the evaporator which reduces the drying load of the process dryer for distillers grain solids (DGS) product. This additional water removed in the evaporator is largely from waste heat sources.

Advantages of the system and method over the prior art include distinct cost and technology advantages over the conventional combined stripping/rectification column, adsorption dehydration as a separate unit operation, and the heat rejection to a cooling tower/cooler/condenser combination. Some of the advantages for the evaporative condenser used in the present process are:

Thermal design using a lower approach temperature causing a reduction in required surface area and the lowest attainable process cooling/condensing temperature.

Significantly reduced fan and pump power requirements resulting in lower operating costs.

Smaller footprint and reduced piping requirement providing for lowered installation costs.

Less prone to fouling resulting in reduced water treatment cost.

Inspection and maintenance can be performed on-line.

Intrinsic freeze protection.

The all metal (stainless steel and galvanized parts) construction allows installation within close proximity of the ethanol production reducing piping runs compared to that needed for cooling towers.

Easily cleaned without dismantling both by manual hydroblasting the exterior of the tubes and by CIP (clean-in-place) chemical means.

At least one of the advantages will be available for various embodiments of the present invention.

DETAILED DESCRIPTION

Figure 1:
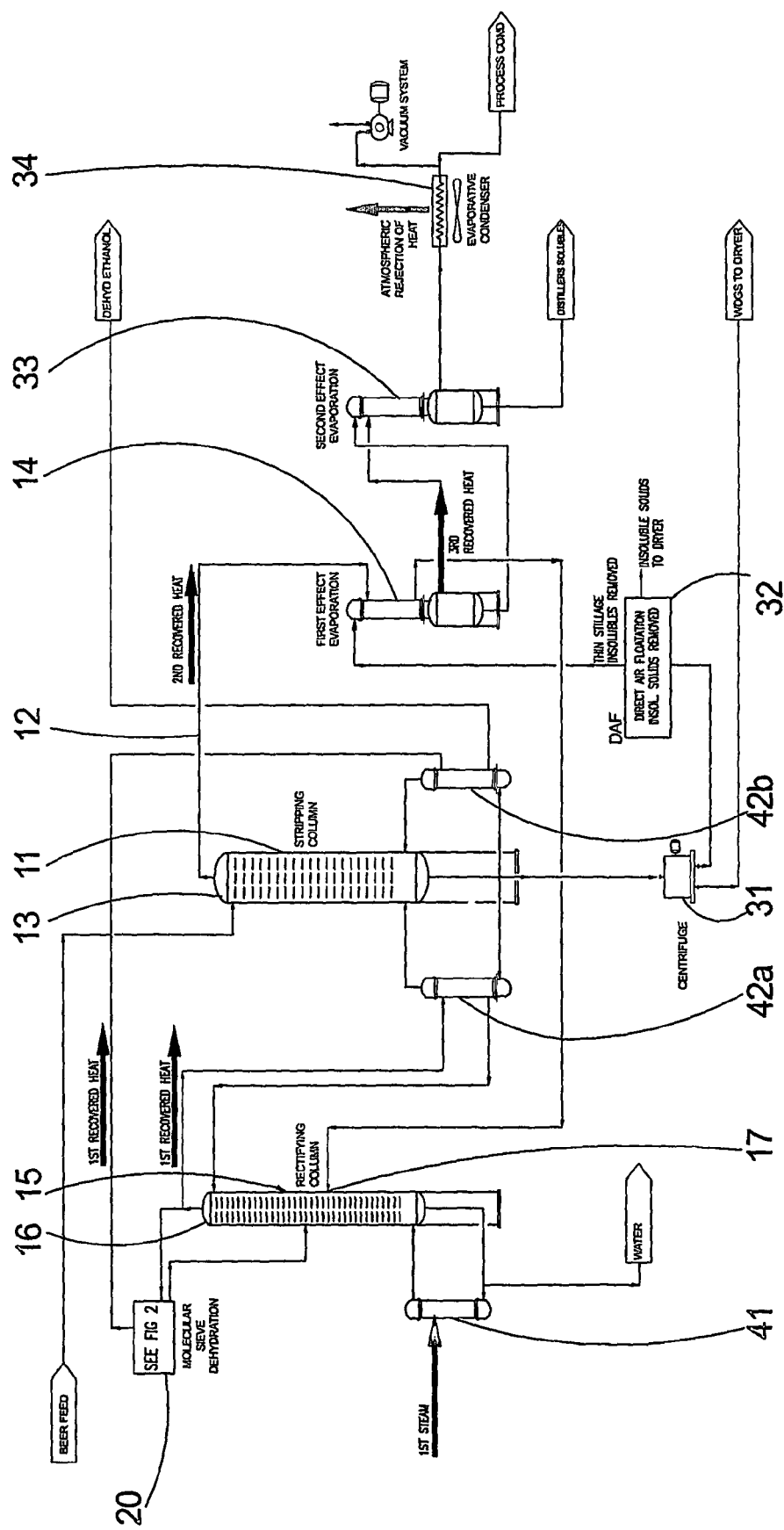
FIG. 1 shows a schematic representation of the material flows and the energy flows of the present system.
Figure 2:
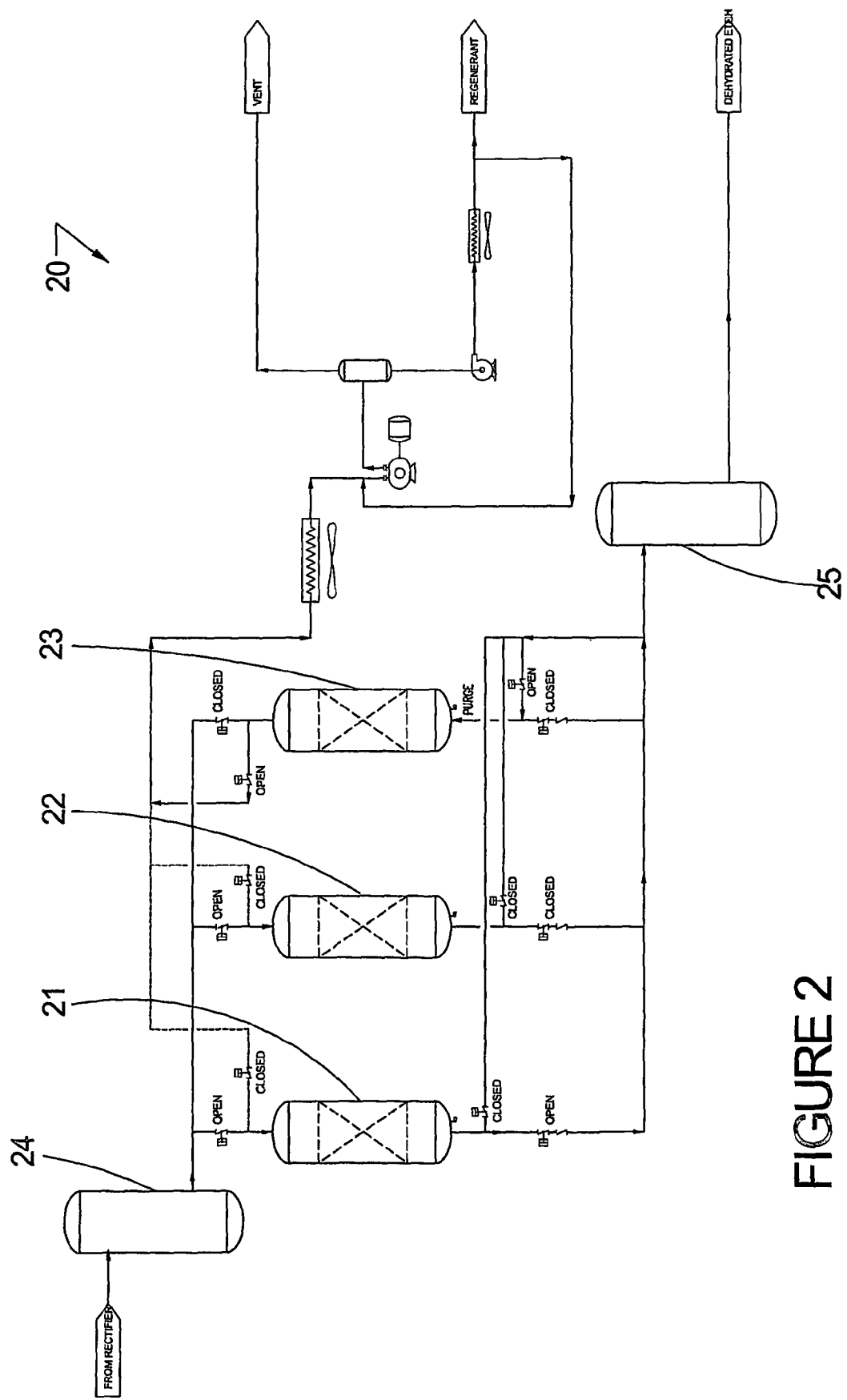
FIG. 2 shows a schematic of the continuous flow molecular sieve dehydration apparatus used in the present invention.

FIG. 1 shows an embodiment of the ethanol plant of the present invention which includes a stripping column, 11 into which a stream of fermented beer is provided and which produces an intermediate concentration ethanol (35-65%) mixture 12 at the top of the stripping column 13 which is then provided to the first effect evaporator 14, condensed, is then provided to the rectifying column 15 which produces a concentrated ethanol mixture of at least eighty percent to ninety-five percent (85% to 95%) at the top of the rectifying column 16 after having been supplied with the stripping column intermediate product at the middle of the rectifying column 17. The concentrated ethanol product from the rectifying column is provided to the dehydration system 20 which has (as shown by FIG. 2), in parallel operation, a first molecular sieve bed 21. The second molecular sieve bed 22 and a third molecular sieve bed 23 and accumulator intake holding tank 24 into which the rectifying column product is supplied and brought to the pressure for introduction of processing through the molecular sieve bed dehydration system. The product of the dehydrated ethanol is sent from an operating molecular sieve bed to the output accumulator tank 25. FIG. 1 also shows the solid removal system which includes the solid-liquid centrifuge system 31, the dissolved/dispersed air floatation separator 32 (DAF) which feed to a first effect evaporator 14 whose product is then sent to the second effect evaporator 33 and from which the second effect vapors are condensed by an evaporative condenser means 34. DAF indicates all forms of air floatation means for separating insoluble particles from fluids.

FIG. 1, further displays the general heat flow of the system and the design of the system's integrated energy flow management that enables the system to cascade the energy flow through high temperature applications, such as the operation of the rectifying column 15 and molecular sieve beds 20, to the lower temperature applications such as the stripping column 11, and eventually to the first and second effect evaporators 14 and 33. FIG. 1 shows rectifying column 15, the first effect evaporator 14, second effect evaporator 33 and the condenser 34 and shows that a first steam supply is provided to a first re-boiler 41 which heats the rectifying column. The product from the rectifying column which is the 85-95% ethanol product mixture is sent to a second re-boiler system which includes two different reboilers 42A and 42B. This first recovered heat includes rectification column 15 reflux vapor as well as the uncondensed mixture that has been passed through the molecular sieve and is used operate the first and second re-boilers that run and heat the stripping column 11. The overhead vapor from the stripping column then provides the first effect evaporator 14 with heat. This energy flow is analogous to a multiple effect evaporator with each heating stage using vapor generated by a prior stage of greater temperature and pressure. A low temperature heat sink as supplied by the evaporative condenser and the wise choice of equipment order allows this scheme to be implemented economically.

Figure 4:
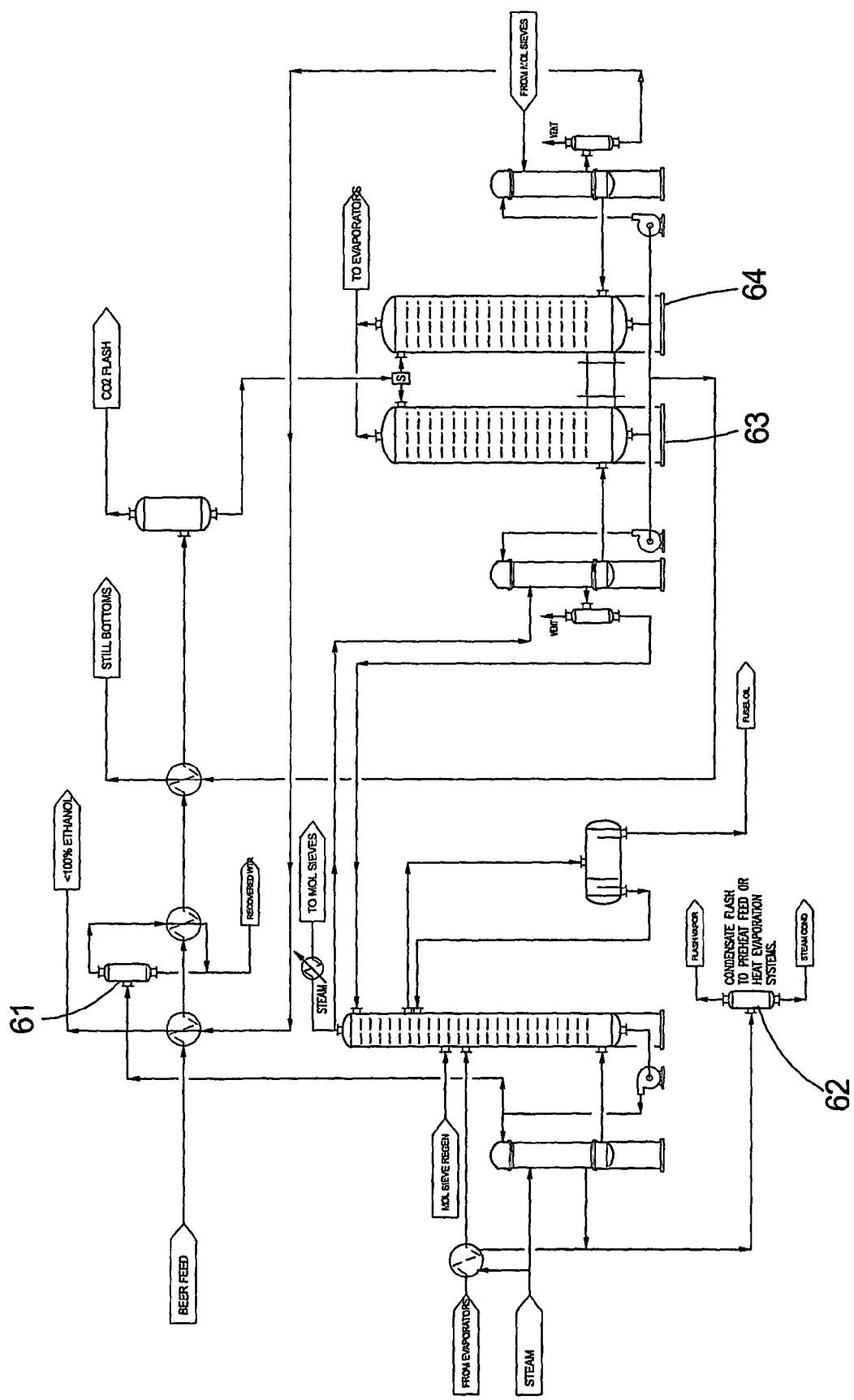
FIG. 4 shows the schematic representation of the split stripping column apparatus, a heat recovery scheme within the distillation section, and its heat flow management and product flow management.

Alternately, the distillation system will have a similar energy flow, i.e. primary energy introduction through the rectification tower for cases configured such as FIG. 4 which shows use of a plurality of stripping columns. Further to that shown in FIG. 4 which has the first and second stripping tower the process can also use multiple rectifying columns configured in parallel or as coupled double effect distillation trains.

It should be noted using separate columns for stripping the ethanol from the beer and for producing azeotropic ethanol (the stripping column and the rectifying column) allows the system to operate the Rectifying Column (Azeotrope at top—16 of FIG. 1) at a sufficiently high pressure to directly operate the pressure swing adsorption process of the molecular sieves. The fermentation liquid with ethanol (beer) needs to be handled at relatively lower pressures and temperatures to limit fouling and protein deposits. The typical process, prior to that presented here, utilizes a combined stripping and rectification sections in a single column operating at a single pressure and condenses overhead azeotropic vapor before or after dehydration.

In many molecular sieve dehydration systems the azeotropic ethanol from distillation is first condensed and then revaporized at higher pressure to drive the pressure swing adsorption system. In other cases the vapor is sent directly from the column overhead to the dehydration system at a lower pressure. In both cases the molecular sieve material (3A Zeolyte) cycles from adsorbing at one pressure to desorbing (releasing water vapor) at a lower pressure. This is the reason for the term "Pressure Swing" adsorption. After the azeotropic ethanol has passed through an active bed of Zeolyte it leaves dehydrated and is condensed recovering the liquid product.

Regardless of the manner in which the vapor feed to the dehydration system is produced, it possesses a significant amount of energy in the vapor form and retains a large portion of this after passing through the Zeolyte bed. This energy is generally released to a cooling water stream in the anhydrous ethanol condenser. This process patent scheme proposes the recovery of this energy. The energy is recovered by condensing the anhydrous ethanol in the stripping column reboiler rather than reject the heat to a condenser. The net result is that the entire energy requirement of the stripping column is satisfied by 1) recovered heat from the anhydrous ethanol vapor leaving Dehydration and 2) from recovered heat of the rectifying column reflux vapor stream. The proportion of heat from these two streams is roughly ⅓ for anhydrous ethanol and ⅔ for reflux vapor. The energy savings for this process from the recovery of heat in Dehydration is due to 1) heat recovered to the stripping column and 2) elimination of the Dehydration System Vaporizer used in many currently operating systems.

FIG. 2 shows how the molecular sieve bed allows continuous processing when the concentrated ethanol vapor from the rectifying column to the input accumulator 24 is Collected and one of the molecular sieve beds [21, 22, or 23] is operated as a dehydration processor while at the same time a second bed is being re-pressurized and that the third molecular bed can be shut off from the system and regenerated so that the beds can be used in a rotating manner from continuous operation. In the case of FIG. 2, the first of the three beds from left to right 21 is dehydrating the ethanol stream with the flow entering from the accumulator 24 and leaving through the accumulator 25, while bed 22 is re-pressurized by a slip stream of feed ethanol from accumulator 24, and bed 23 is regenerated assisted by a slip stream of dehydrated ethanol leaving bed 21. Regeneration occurs by pressure reduction of the molecular sieve bed accompanied by a slip stream of dehydrated ethanol to dehydrate the bed driving the water out of the molecular sieve which can then be condensed and recovered back to the rectification column (15 of FIG. 1).

The ethanol/water mixture produced from the rectifying column is directed to a dehydration system comprising at least three molecular sieves and a reservoir tank. The three molecular sieve vessels are provided with a control valve manifold so that at any given time one of the molecular sieves is dehydrating the rectifying column product and producing ethanol with less than 0.7 percent water. A second molecular sieve is being recharged so that it can dehydrate the product stream from the rectifying column and the third column is being used to balance the pressure in the system by assuring full re-pressurization prior to switching beds so that as the product stream is switched from one of the molecular sieve tanks to the next so that there is not any increase or decrease in the product flow from the system. After passing through the molecular sieve system which produces a heat flow, which can be used to power the first stripping column, the fuel ethanol product is removed from one of the molecular sieves.

This process scheme for dehydration provides a steady flow of dehydrated ethanol at a constant pressure and temperature. It is essential to achieve this since this stream is used for heating the stripping column in one of the stripping column reboilers. Distillation columns perform best when operating conditions are steady and upsets are minimized. The three bed molecular sieve system is presented here to achieve this goal. Alternately a sufficiently sized two bed system with suitable switching controls could be substituted and used as part of the process innovation proposed here.

An important part of ethanol production plants is the recovery of Distillers Grain Solids which is sold as animal feed high in protein content. The solids recovery means comprises a separator for removing insoluble solids from the by-product stream and an evaporator for removing water from the soluble solids portion of the by-product stream. In one embodiment of the present invention, an evaporative condenser system is used in the production of fuel ethanol as described in the overall process scheme to condense the final vapors from the evaporator systems. This evaporative condenser allows condensation of the process vapors at lower pressures and temperatures making the overall process scheme more economically feasible and operationally practical. Viability of the process scheme stems from cascading energy from the rectifying column to the stripping column to the first effect evaporator to the second effect evaporator to the condenser. Alternately, the first effect evaporator vapor could be sent directly to the condenser as a variation of this process. This scheme is furthermore demanded due to the need to operate the stripping column and evaporators at the lowest possible temperature and minimize fouling of surfaces.

In many cases, the stripping column in this process must operate at 185° F. or lower, as is the case of certain feed grains such as wheat and barley, due to the fouling properties of stillage in fuel ethanol plants. Corn based ethanol plants can benefit as well by limiting the processing temperature of stillage to 200° F. (220° F. maximum). These and some other ethanol fuel plant feed stocks are high in protein and other constituents that denature or foul the surface of distillation trays and heating surfaces at increasing rates as operating temperatures are increased. A lower temperature allows more time between cleanings and less intensive cleaning cycles. Ultimately this relates directly to production time "on-line" and a greater yearly production of ethanol, Distillers Dried Grains (DDG), Distillers Dried Solubles (DDS), and Distillers Dried Grains and Solubles (DDGS). Although prepared for improved operation of highly fouling mash preparations, this process will also provide the same lower fouling benefits to Corn based systems with a preferred application of this process operating the stripping column at 200° F. or less.

In the condenser used in the present invention, process fluid is introduced into condensing tubes and water is sprayed above the tubes. The water flows via gravity over the tubes and through the tube bundle(s) that contain the condensing process vapor and/or process fluid to be cooled. Air flows concurrently with the cascading water through the tube bundle. Alternately a counterflow means of contacting spray water and air could be used. Heat from the condensing process vapor or hot process fluid is released into the cascading water stream. Prior to reaching a water collection pan located at the bottom of the unit, heat is transferred from the cascading water into the air stream via vaporization.

Once the water is collected in a bottom collection pan, the air stream is forced to turn upward by forced circulation created by a fan or fans located at the top of the unit. This provides for maximum free water removal resulting in minimal drift. Fans discharge the air stream at high velocity preventing short-circuiting of the air stream. Alternately, the air flow and water flow can be countercurrent to one and other in a forced draft mode. In any case water is used to carry heat from the tubes and evaporated into the air which by its humidification rejects the heat from the plant.

An evaporative condenser eliminates the need for separate cooling towers, condensers, chillers and coolers. These are all benefits to the fuel ethanol plant with the most intrinsic for this process being that of reduced overall temperature of operation for the protein bearing fluids (beer, mash, stillage, distillers syrup, thin stillage, etc.).

In operation of one embodiment, the product (overhead vapor) from the stripping column is used as a second recovered heat source to run the evaporator and then the evaporative condenser. Heat from the first effect evaporator effect is used to run the second evaporator effect.

A further recovered heat can be used for the clean-in-place (CIP) washings as the makeup to the evaporative condenser as a means of waste water minimization. Many ethanol plants encounter difficulties with overall water usage and balance of water demands and effluent outfall flows. The evaporative condenser is capable of using waste water streams for make up water and thus can reduce waste water outfall at a very low expense by removing water from the waste water stream.

Also, as shown in FIG. 1 the by-product stream (stillage) from the stripping column is sent to the solids removal means comprised of a centrifuge [31 of FIG. 1] and a dissolved or dispersed air flotation removal system [32 of FIG. 1]. Air floatation systems include Dissolved Air Floatation, Dispersed Air Floatation, Induced Air Floatation, and Diffused Air Floatation. Designs come in many forms including rectangular, circular, inclined parallel plate, and cross flow systems. All employ a finely divided dispersion of air in liquid to trap or adhere to suspended solids and droplets in the bulk liquid being cleaned.

Air floatation is one of the oldest methods of waste treatment and proven in liquid cleaning operations for municipal and industrial wastewater treatment. It is used for removal of solids, oil and grease, and fibrous materials from wastewater. Suspended solids removals as high as 99+% can be attained in commercially constructed systems. This performance is accomplished by production of microscopic air bubbles. These bubbles enhance the buoyancy of some suspensions and solids by carrying wastewater contaminants to the surface for removal by mechanical skimming. One embodiment of the present invention proposed in this patent includes an option to employ Air Floatation to treat the liquid feed to the evaporator. The benefit to fuel ethanol processing by using Air Floatation is reduced operating costs when drying Distillers Grain and Distillers Solubles.

The bottom liquid off the stripping column consists of the fermentation mash (stillage, beer, etc.) which has now been depleted of ethanol in the stripping column. This liquid contains large and fine suspended solids and dissolved solids. The bottoms stream is sent to a centrifuge or decanter [31 of FIG. 1] to separate the soluble solids retained in the centrate and the insoluble solids which leave in the centrifuge (or decanter) "cake". This cake is typically ⅓ solids and ⅔ water with a consistency of wet sawdust. The centrate is a thin liquid of moderate viscosity (1 to 25 cps) which retains some insoluble fine particles that could not be removed by centrifuging.

The fine particles of insoluble solids remaining in the centrate become a limiting factor in the operation of the evaporator. Typically, dry milled process fuel ethanol plants must limit the evaporator to concentrating this fluid to 30 to 35% total solids. The resulting concentrate is called Distillers Syrup. When insoluble solids are removed from the feed this syrup can be concentrated to close to 50% total solids.

The process scheme proposed in this invention includes the option to use Air Floatation to allow operation of the evaporator to a concentration range above 35% with an object of reaching close to 50%. The energy used to achieve this evaporation is typically waste heat from distillation or elsewhere in the plant and thus "free" energy. The energy used in the dryer, to which the Distillers Grain (centrifuge cake) and the Distillers Syrup are sent, is plant steam or hot air produced in a gas or other fuel burner. Thus the additional water removed in the evaporator does not need to be removed in the dryer and a significant amount of energy is thus saved.

This reduced heat load for the dryer results in a reduced operating cost for the plant. Furthermore, since the modern fuel ethanol plant's dryer exhaust must be treated in a thermal oxidizer, there is an additional energy savings for that unit. The dryer exhaust volume is reduced in proportion to the reduced water that needs to be removed in the dryer. The lower load to the thermal oxidizer also reduces the energy required by the thermal oxidizer. Overall a fairly significant energy savings is achieved with a low cost treatment step and this further improves the economics of running a fuel ethanol plant.

A key aspect of this present facility is careful energy management throughout the system such that a primary heat supply (steam or other means) can be used as the energy source for the highest thermal level (temperature) energy requirement (rectification) then cascade to intermediate energy requirement steps, (surface absorption dehydration) and then lower temperature steps (stripping ethanol/water azeotrope) and evaporative concentration of thin stillage to syrup or Distillers Soluble Solids.

The apparatus of the present invention comprises a stripping column [11 of FIG. 1], into which beer is fed at the top of the column so that a stripped ethanol water mixture is produced at the top of the column. This vapor mixture of intermediate ethanol concentration then flows to heat an evaporator used to remove water from Distillers Soluble Solids or Thin Stillage. Energy for this stripping column is provided from the overhead concentrated ethanol vapor product from a rectifying column being sent to a reboiler which drives the stripping column. The rectifying column is heated by the primary steam source for this ethanol plant. The rectification unit comprised of the rectifying column and steam preheaters to it, by this invention, are the only apparatus requiring primary steam supply, although supply of steam to other parts of the plant is not precluded as an option to the process.

The stripping column produces an uncondensed stream (35 to 65% ethanol) that is sent to the evaporation system and is condensed in the first evaporative system for concentrating thin stillage (centrate). The condensed stripper vapor, after it powers the first evaporative effect, is then redirected to the rectifying column to produce a higher concentration of ethanol and water mixture which once the leaving the top of the rectifying column is then sent to the dehydration system. Process water is drawn from the bottom of the rectifying column and can be disposed of thereafter or reused in mash preparation.

From the bottom of the stripping column stillage is sent to a centrifuge clarifying system, which is then passed back to a direct air floatation/separation (DAF) apparatus. This system allows the solid materials to be recycled through the centrifuge to produce a stillage stream that goes to a dryer.

The liquid portion produced by the direct air floatation system is directed to a first stage of evaporation and optionally to a second and further stages of evaporation and after which the concentrated syrup can be blended with the solids from the centrifuge forming a Wet Distillers Grain Solids stream. Optionally, this stream may then be dried to produce DDGS (dried distillers grain solids) if storage for any period of time is needed.

Apparatus for practicing the invention in the form of a production facility comprises a distillation means configuration: in which a) all heat to the system first is supplied to the rectifying column operating at an elevated pressure, b) all the heat from the top of the rectifying column including refluxed vapor and product overhead vapor streams are recovered back into the process, c) this heat ultimately is transferred to heat the stripping column operating at a lower pressure than the rectifying column, d) the overhead vapors (heat) from the stripping column is used to heat the evaporation system which can be a single, double, or triple effect, and e) the final heat from the system is then rejected to atmosphere by use of a condenser employing spray water and circulating air on the exterior of the tubes to lower the possible condensing temperature to close to the local wet bulb temperature. Further the evaporator is fed with the stripping column bottoms stream which has been centrifuged to remove insoluble solids (standard process not claimed in this patent) but which is further treated by Direct Air Floatation to remove more insoluble solids (this is a claim in this patent) and allow a feed to the evaporator that is much lower in insoluble solids content. The evaporator in such a process then concentrates its feed solution to a greater level and much lower water content (35 to 50% total solids/65 to 50% water).

In operation the stripping column receives a preheated feed stream of fermented liquid containing ethanol (commonly called "beer") at the top tray(s) of the distillation column. This flows from tray to tray traveling to the bottom of the column where it is heated and partially vaporized. The vapor travels up the column removing increasing amounts of ethanol from tray to tray till exiting at the top of the column. The overhead vapors are condensed in the evaporator and the condensed aqueous ethanol is pumped to the rectifying column. The stripping column in this patent is unique in that it is heated by overhead condensing reflux vapor from the rectifying column and condensing product ethanol from the dehydration-molecular sieve system. The stripping column operates at a pressure of between 5 psia and 20 psia. The overhead vapors are of sufficient pressure and temperature that the heat content of the vapor can be further recovered in other useful heating, particularly evaporation of the clarified stripping column bottoms stream. Typically the overhead vapors are of a temperature between 140 F and 192 F and a concentration of between 35% ethanol and 65% ethanol. Although auxiliary steam heating could be employed, the usefulness of this process configuration is that only waste heat from other parts of the ethanol recovery process is needed to operate the stripping column. One feature of the low pressure operation of the stripping column is reduced fouling due to protein deposition and less frequent cleaning down time.

In operation the rectifying column receives a feed of 35% to 65% ethanol from the condensed overhead vapors of the stripping column. The ethanol is recovered in the overhead vapor from the rectifying column to a strength of between 85% up to the azeotropic concentration of ethanol/water (approximately 95+%). The water in the feed is mainly removed in the bottoms stream from the column at a very low ethanol composition. The column is operated at between 30 to 100 psia depending on design economics. This elevated pressure allows sufficient temperature to heat the stripping column and sufficient pressure to operate the molecular sieve pressure swing dehydration system directly without first condensing the overhead vapors. Ultimately these dehydrated overhead vapors are used to heat the stripping column. Other features of the rectifying column are typical to design of fuel ethanol plants.

Also, in operation the molecular sieve dehydration apparatus dehydrates the product stream produced from the rectifying column and is operated in such a way as to minimize flow and pressure fluctuations in the product vapor stream returning to the stripping column for heating this column. 85% to 95+% ethanol enters a series of three dehydration columns packed with zeolyte operated in parallel and at different cycles of 1) dehydration, 2) regeneration, and 3) repressurization. This is a typical pressure swing adsorption system (normally two "beds") operated uniquely for dehydration of ethanol vapor under steady flow and pressure conditions. In the typical molecular sieve dehydration "bed" the ethanol is vaporized from a liquid, slightly superheated, and fed to a vertical column containing type A zeolyte or other adsorbent with an affinity for water. The water molecule enters the adsorbent material forming a physical bond with the substrate and "condensing" onto the substrate. This physical process occurs more readily at higher pressures much in the same way that water condenses at high pressures and high temperatures. The adsorbed water is then removed by simply lowering the pressure. The adsorbent substrate at lower pressures releases the water much in the way that high temperature condensate flashes off under vacuum. The "condensed" water on the substrate vaporizes and is removed in the regeneration cycle. This water vaporization and preparation of the molecular sieve for the dehydration cycle is aided by a slip steam of dehydrated ethanol to lower the gas phase partial pressure of water and increase the dewatering of the substrate of the molecular sieve. In a typical two bed system flow is interrupted each time a bed fills with water and is switched to the next parallel bed. This flow interruption causes a pressure and flow rate discontinuity that would not be suitable for heating a distillation column.

The invention of the present system process recovers all of this heat. For example one process used in the industry recovers heat from the reflux of the distillation column (one column used only) to heat the evaporator. 67 to 75% of the column heat is then recovered while 25 to 33% is removed by condensing before or after dehydration. This present process recovers both of these streams with a net steam usage that is about 67 to 75% of this design.

Figure 3:
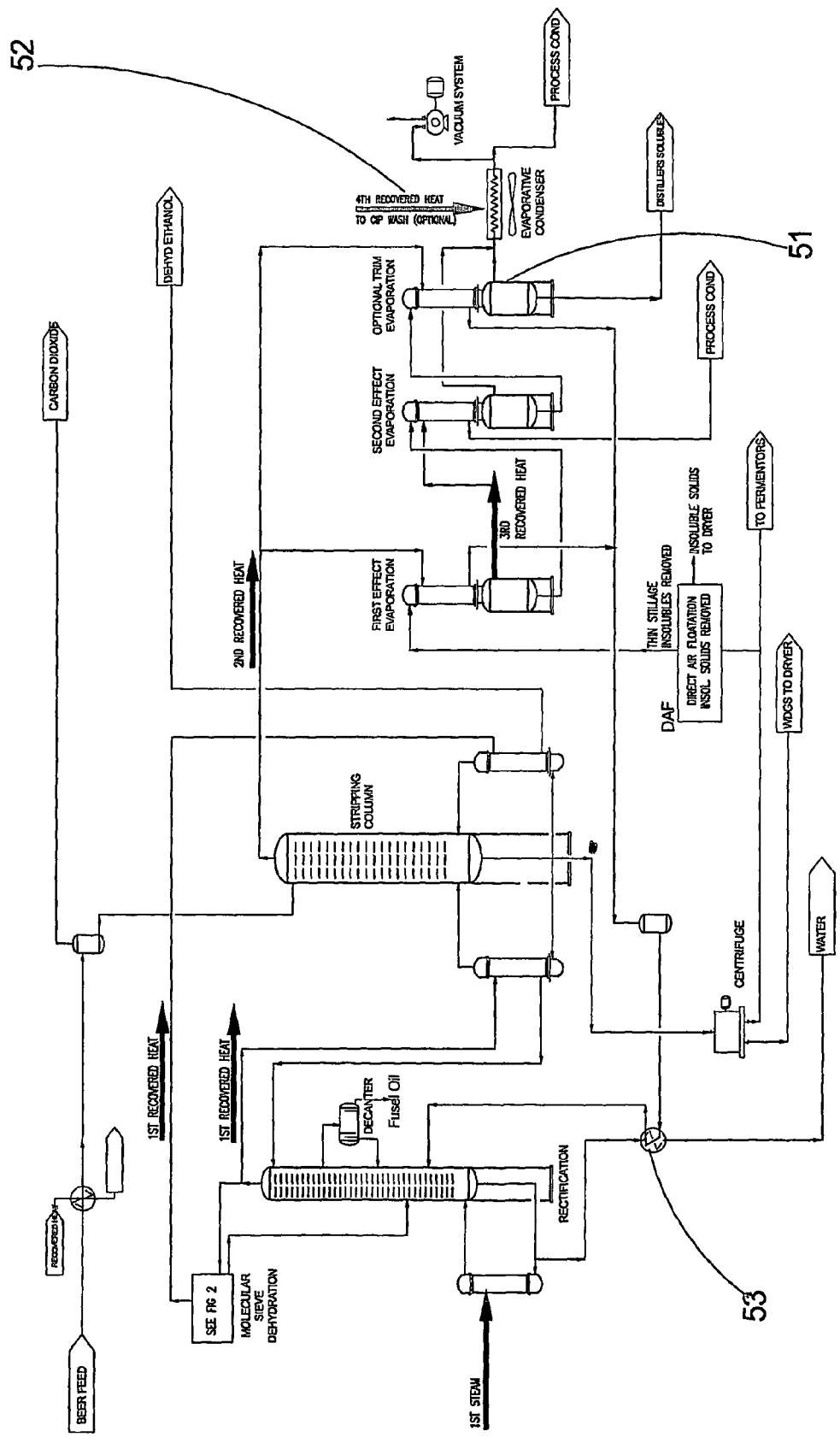
FIG. 3 shows an alternative embodiment of the invention demonstrating heat recovery options and an optional trim evaporator.

Variations in the application of this technology include some features illustrated in FIGS. 3 and 4. FIG. 3 presents an alternate evaporation scheme in which an optional trim evaporator 51 is used to balance energy available from distillation with that needed for evaporation. In certain cases the evaporator in a double effect configuration as presented in FIG. 1 does not need all the vapor generated in the stripping column to accomplish the required concentration of soluble solids. In this case the vapor stream from the stripping column can be split to operate a single effect unit 51 thus increasing the vapor used for a quantity of evaporation heat load. FIG. 1 also presents a notation at the evaporative condenser indicating that waste water or clean-in-place (CIP) solutions 52 can be used as make-up water to this unit reducing the fresh water usage of the plant. Finally, an alternate heat recovery option in which bottoms product stream from the rectifying column is used to preheat the intermediate ethanol feed to the rectifying column with the feed to bottoms interchanger 53.

FIG. 4 shows the use and alternate beer feed preheating scheme including the vapor flash unit 61 reducing the heating temperature of heat recovered from the rectifying column bottoms. This allows recovery of the high temperature bottoms stream without actually contacting the beer with this high temperature. Further the steam condensate from the rectifying column is also flashed 62 to generate a vapor of 190 to 220° F. (near atmospheric pressure) for further recovery of heat value to be used in the evaporator or other process heating. Finally the use of parallel stripping columns 63 and 64 is illustrated.

The invention claimed is:

1. A method for producing substantially anhydrous ethanol comprising:
   (a) distilling a stream feed of beer liquor in a stripping column to produce a first concentrated ethanol overhead vapor, wherein said stripping column has a top portion and a bottom portion;
   (b) condensing said first concentrated ethanol overhead vapor to form a first ethanol and water mixture;
   (c) distilling said first ethanol and water mixture in a rectifying column, which rectifying column is heated by a primary steam supply and which rectifying column has a top portion and a bottom portion, to produce a second concentrated ethanol overhead vapor, a portion of which is product vapor and a portion of which is reflux vapor;
   (d) condensing said reflux vapor in a reboiler system to form condensed reflux;
   (e) returning said condensed reflux to the top portion of the rectifying column;
   (f) recovering heat from step (d);
   (g) heating said stripping column with the heat recovered in step (f);
   (h) dehydrating said product vapor using a molecular sieve dehydration means to produce substantially anhydrous ethanol;
   (i) recovering heat from step (h); and
   (j) further heating said stripping column with the heat recovered in step (i).

2. The method of claim 1 wherein the primary steam supply is at a temperature of 265 to 350 degrees F. and the rectifying column is at a temperature of 240 to 320 degrees F. and the second concentrated ethanol overhead vapor is 80 to 95 percent ethanol and is at a temperature of 210 to 300 degrees F.

3. The method of claim 1 wherein said stripping column is at a temperature of 150 to 225 degrees F. at the bottom portion of the stripping column and is at a temperature of 140 to 192 degrees F. at the top portion of the stripping column.

4. The method of claim 1 wherein said stripping column is at a temperature of 185 to 220 degrees F. at the bottom portion of the stripping column.

5. The method of claim 1 wherein said rectifying column is at a pressure of 30 to 100 psia.

6. The method of claim 1 wherein distilling said first ethanol and water mixture in a rectifying column also produces a steam condensate, wherein said method further comprises:
   (a) flashing said steam condensate;
   (b) recovering heat from step (a); and
   (c) preheating said stream feed of beer liquor prior to distilling with the heat recovered in step (b).

7. The method of claim 1 wherein said distilling said stream feed of beer liquor occurs in a plurality of stripping columns.

8. The method of claim 1 wherein said distilling said first ethanol and water mixture occurs in a plurality of rectifying columns.

9. A method for producing substantially anhydrous ethanol and animal feed comprising:
(a) distilling a stream feed of beer liquor in a stripping column to produce a first concentrated ethanol overhead vapor and a grain stillage bottoms product, wherein said stripping column has a top portion and a bottom portion;
(b) condensing said first concentrated ethanol overhead vapor to form a first ethanol and water mixture;
(c) recovering heat from step (b);
(d) distilling said first ethanol and water mixture in a rectifying column, which rectifying column is heated by a primary steam supply and which rectifying column has a top portion and a bottom portion, to produce a second concentrated ethanol overhead vapor, a portion of which is product vapor and a portion of which is reflux vapor;
(e) condensing said reflux vapor in a reboiler system to form condensed reflux;
(f) returning said condensed reflux to the top portion of the rectifying column;
(g) recovering heat from step (e);
(h) heating said stripping column with the heat recovered in step (g);
(i) dehydrating said product vapor using a molecular sieve dehydration means to produce substantially anhydrous ethanol;
(j) further recovering heat from step (i);
(k) heating said stripping column with the heat recovered in step (j);
(l) centrifuging said grain stillage bottoms product to form a decanted cake and a centrate;
(m) drying said decanted cake to produce animal feed;
(n) evaporating water from said centrate in an evaporator means to produce distillers syrup, wherein said evaporator means is heated with the heat recovered in step (c); and
(o) drying said distillers syrup to produce animal feed.

10. A system for producing substantially anhydrous ethanol comprising:
(a) distillation means which includes a stripping column having a reboiler means and a rectifying column in communication with said stripping column;
(b) condensing means in fluid communication with the overhead of the rectifying column of said distillation means;
(c) dehydration means which includes a molecular sieve dehydration means in communication with said distillation means and condensing means; and
(d) energy flow means including means for heating the reboiler means with vapors from said rectifying column and said molecular sieve dehydration means and heating said stripping column with said reboiler means.

11. The system of claim 10 wherein said dehydration means further includes accumulator means in communication with said molecular sieve dehydration means.

12. The system of claim 11 wherein said molecular sieve dehydration means comprises a plurality of molecular sieve beds used in a rotating manner so as to allow continuous flow from said rectifying column to said reboiler means.

13. The system of claim 12 wherein said accumulator means comprises an accumulator tank before the plurality of molecular sieve beds.

14. The system of claim 12 wherein said accumulator means comprises an accumulator tank after the plurality of molecular sieve beds.

15. The system of claim 10 further comprising an evaporative condenser in communication with said molecular sieve dehydration means and said rectifying column.

16. The system of claim 10 wherein said distillation means includes a plurality of stripping columns.

17. The system of claim 10 wherein said distillation means includes a plurality of rectifying columns.

18. A system for producing substantially anhydrous ethanol and animal feed comprising:
(a) distillation means which includes a stripping column having a reboiler means and a rectifying column in communication with said stripping column;
(b) condensing means in communication with the rectifying column of said distillation means;
(c) dehydration means which includes a molecular sieve dehydration means in communication with said distillation means and condensing means;
(d) energy flow means including means for heating the reboiler means with vapors from said rectifying column and said molecular sieve dehydration means and heating said stripping column with said reboiler means and heating an evaporator means with vapors from said stripping column;
(e) solid stream processing means in communication with said distillation means, wherein said solid stream processing means includes a centrifuge and an evaporator means; and
(f) drying means in communication with said solid stream processing means.

* * * * *